(12) United States Patent
Akiyama et al.

(10) Patent No.: US 8,994,317 B2
(45) Date of Patent: Mar. 31, 2015

(54) OUTPUT CONTROL APPARATUS FOR ELECTRIC MOTOR AND METHOD FOR CONTROLLING OUTPUT OF ELECTRIC MOTOR

(71) Applicant: Honda Motor Co., Ltd., Tokyo (JP)

(72) Inventors: Masahiko Akiyama, Wako (JP); Yuji Minoda, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 112 days.

(21) Appl. No.: 13/757,854

(22) Filed: Feb. 4, 2013

(65) Prior Publication Data

US 2013/0257319 A1 Oct. 3, 2013

(30) Foreign Application Priority Data

Mar. 30, 2012 (JP) .................................. 2012-080135

(51) Int. Cl.
| | | |
|---|---|---|
| *H02P 27/04* | (2006.01) | |
| *H02P 27/06* | (2006.01) | |
| *H02P 29/02* | (2006.01) | |
| *B60L 11/18* | (2006.01) | |
| *B60L 15/00* | (2006.01) | |
| *B60L 15/02* | (2006.01) | |

(52) U.S. Cl.
CPC .............. *H02P 27/06* (2013.01); *H02P 29/028* (2013.01); *B60L 11/1803* (2013.01); *B60L 11/1881* (2013.01); *B60L 15/007* (2013.01); *B60L 15/02* (2013.01); *B60L 2210/30* (2013.01); *B60L 2210/40* (2013.01); *B60L 2240/421* (2013.01); *B60L 2240/526* (2013.01); *B60L 2240/529* (2013.01); *B60L 2240/549* (2013.01); *Y02T 10/7241* (2013.01); *Y02T 90/34* (2013.01); *Y02T 10/642* (2013.01)
USPC ............................. 318/800; 361/39; 361/104

(58) Field of Classification Search
CPC ............. B60L 3/00; B60L 11/18; H02D 7/10; H02J 7/00; H01M 10/44; G01R 31/36
USPC ............ 318/800, 801; 361/1, 23; 701/41–43; 180/443, 446; 388/811, 819
See application file for complete search history.

(56) References Cited

U.S. PATENT DOCUMENTS

| | | | | |
|---|---|---|---|---|
| 5,319,294 | A * | 6/1994 | Ohto et al. | ............... 318/568.22 |
| 5,519,294 | A * | 5/1996 | Chen et al. | .................... 318/432 |
| 5,787,376 | A * | 7/1998 | Nishino et al. | .................. 701/41 |
| 5,844,387 | A * | 12/1998 | Mukai et al. | .................. 318/432 |
| 8,878,474 | B2 * | 11/2014 | Kezobo et al. | ........... 318/400.21 |

FOREIGN PATENT DOCUMENTS

JP 2011-250610 12/2011

*Primary Examiner* — Rina Duda
*Assistant Examiner* — Bickey Dhakal
(74) *Attorney, Agent, or Firm* — Mori & Ward, LLP (57) ABSTRACT

An output control apparatus for an electric motor includes a phase-current instruction-value setting device, a draw-current allowable-value storage device, a phase-current allowable-value setting device, and a phase-current instruction-value limiting device. The draw-current allowable-value storage device is configured to store a draw current allowable value of an electric storage device corresponding to an allowable current value of a system disconnecting-connecting device provided in a power system from the electric storage device to the electric motor. The phase-current allowable-value setting device is configured to set a phase current allowable value based on the draw current allowable value and an ON time of a switching element in a power converter. The phase-current instruction-value limiting device is configured to compare the phase current instruction value with the phase current allowable value to limit the phase current instruction value so as not to exceed the phase current allowable value.

17 Claims, 3 Drawing Sheets

(56) References Cited

U.S. PATENT DOCUMENTS

| | | | |
|---|---|---|---|
| 2008/0030155 A1* | 2/2008 | Patel et al. | 318/400.02 |
| 2008/0067960 A1* | 3/2008 | Maeda et al. | 318/400.02 |
| 2009/0073617 A1* | 3/2009 | Gunji | 361/23 |
| 2009/0256503 A1* | 10/2009 | Ueda et al. | 318/400.02 |

* cited by examiner

OUTPUT CONTROL APPARATUS FOR ELECTRIC MOTOR AND METHOD FOR CONTROLLING OUTPUT OF ELECTRIC MOTOR

CROSS-REFERENCE TO RELATED APPLICATIONS

The present application claims priority under 35 U.S.C. §119 to Japanese Patent Application No. 2012-080135, filed Mar. 30, 2012, entitled "Output Control Apparatus for Electric Motor." The contents of this application are incorporated herein by reference in their entirety.

BACKGROUND OF THE INVENTION

1. Field of the Invention

The present disclosure relates to an output control apparatus for an electric motor and a method for controlling an output of the electric motor.

2. Discussion of the Background

Hitherto, a power supply apparatus is disclosed in Japanese Unexamined Patent Application Publication No. 2011-250610 (paragraphs [0008], [0009], [0021], [0022], and [0029]) which estimates the temperature of a fuse to calculate an allowable current value and controls supply of electric power to an electric motor so that the value of current flowing through the fuse does not exceed the allowable current value in order to prevent melting of the fuse for protecting a battery, which is a driving power source for the electric motor.

Electrical components including harnesses and relays that are capable of disconnecting the circuit system exist in a power system (power supply system) from the battery to the electric motor, in addition to the fuse for protecting the circuit upon occurrence of over-current. In use of such electrical components in a product, the allowable current value is set in accordance with a rated current value of each electrical component (the allowable current value≤the rated current value).

Power control from the battery to the electric motor is required while avoiding the melting of the fuse, welding of the relays and the harnesses, and the like. With the technology disclosed in the Japanese Unexamined Patent Application Publication No. 2011-250610, it may be possible to perform the power control while protecting the fuse.

SUMMARY OF THE INVENTION

According to one aspect of the present invention, an output control apparatus for an electric motor includes a phase-current instruction-value setting device, a draw-current allowable-value storage device, a phase-current allowable-value setting device, and a phase-current instruction-value limiting device. The phase-current instruction-value setting device is configured to set a phase current instruction value of the electric motor based on a request to the electric motor to which electric power is supplied from at least an electric storage device via a power converter including a switching element. The draw-current allowable-value storage device is configured to store a draw current allowable value of the electric storage device corresponding to an allowable current value of a system disconnecting-connecting device provided in a power system from the electric storage device to the electric motor. The phase-current allowable-value setting device is configured to set a phase current allowable value based on the draw current allowable value and an ON time of the switching element in the power converter. The phase-current instruction-value limiting device is configured to compare the phase current instruction value with the phase current allowable value to limit the phase current instruction value so as not to exceed the phase current allowable value.

According to another aspect of the present invention, an output control apparatus for an electric motor includes phase-current instruction-value setting means, draw-current allowable-value storage means, phase-current allowable-value setting means, and phase-current instruction-value limiting means. The phase-current instruction-value setting means is for setting a phase current instruction value of the electric motor based on a request to the electric motor to which electric power is supplied from at least an electric storage device via a power converter including a switching element. The draw-current allowable-value storage means is for storing a draw current allowable value of the electric storage device corresponding to an allowable current value of a system disconnecting-connecting device provided in a power system from the electric storage device to the electric motor. The phase-current allowable-value setting means is for setting a phase current allowable value based on the draw current allowable value and an ON time of the switching element in the power converter. The phase-current instruction-value limiting means is for comparing the phase current instruction value with the phase current allowable value to limit the phase current instruction value so as not to exceed the phase current allowable value.

According to further aspect of the present invention, in a method for controlling an output of an electric motor, a phase current instruction value of the electric motor is set based on a request to the electric motor to which electric power is supplied from at least an electric storage device via a power converter including a switching element. A draw current allowable value of the electric storage device is set. The draw current allowable value corresponds to an allowable current value of a system disconnecting-connecting device provided in a power system from the electric storage device to the electric motor. A phase current allowable value is set based on the draw current allowable value and an ON time of the switching element in the power converter. The phase current instruction value is compared with the phase current allowable value to limit the phase current instruction value so as not to exceed the phase current allowable value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a characteristic diagram for describing a phase current allowable value and so on.

DESCRIPTION OF THE EMBODIMENTS

The embodiments will now be described with reference to the accompanying drawings, wherein like reference numerals designate corresponding or identical elements throughout the various drawings.

Figure 1:
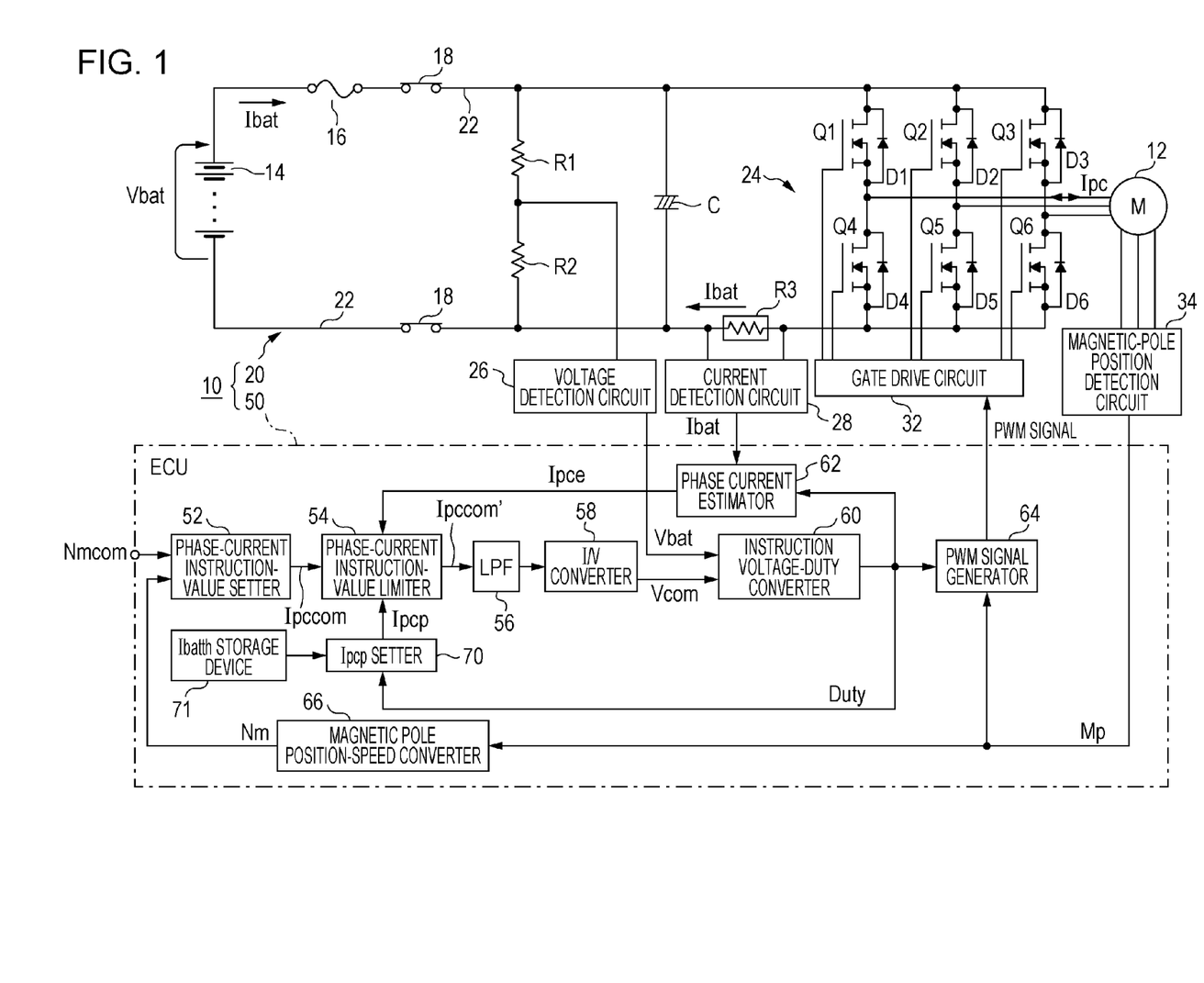
FIG. 1 is a block diagram illustrating an example of the configuration of an output control apparatus for an electric motor according to an embodiment of the present disclosure.

FIG. 1 is a block diagram illustrating an example of the configuration of an output control apparatus 10 for an electric motor 12 according to an embodiment.

Referring to FIG. 1, the output control apparatus 10 basically includes a drive unit 20 for the electric motor 12 and an electronic control unit (ECU) 50, which is a control unit that controls the drive unit 20 to control the output from the electric motor 12.

The drive unit 20 includes an electric storage device 14, such as a capacitor or a secondary battery. The electric power of the electric storage device 14 is supplied to the electric motor 12 via a fuse 16, relays 18, harnesses 22, and an inverter 24. Each of the fuse 16, the relays 18, and the harnesses 22 functions as a system disconnecting and/or connecting unit (hereinafter referred to as a system disconnecting-connecting unit). The inverter 24 functions as a power converter.

A voltage-dividing circuit that is composed of a resistor R1 and a resistor R2 and that detects a power supply voltage value Vbat of the electric storage device 14 and a smoothing capacitor C are connected between the positive electrode and the negative electrode of the electric storage device 14. A shunt resistor R3 is connected to the negative electrode side of the electric storage device 14. The shunt resistor R3 may be connected to the positive electrode side of the electric storage device 14.

The power supply voltage value Vbat, which is the voltage between both ends of the electric storage device 14, is output from the output side of a voltage detection circuit 26 the input side of which is connected to the connection point between the resistor R1 and the resistor R2. A draw current value Ibat of the electric storage device 14 is output from the output side of a current detection circuit 28 that is connected between both ends of the resistor R3.

The inverter 24 has, for example, a three-phase full bridge configuration including transistors Q1 to Q6, which are switching elements, and diodes D1 to D6 reversely connected to the transistors Q1 to Q6, respectively. The middle points between upper arm elements, for example, the transistor Q1 and the diode D1, and lower arm elements, for example, the transistor Q4 and the diode D4, of the respective phases are connected to the respective coils of three phases: a U phase, a V phase, and a W phase of the electric motor 12.

The transistors Q1 to Q6 are switched via a gate drive circuit 32 on the basis of a pulse width modulation (PWM) signal to control an ON time of the transistors Q1 to Q6 within a certain period (a certain time).

Direct current (DC) voltage of the power supply voltage value Vbat of the electric storage device 14 is converted into each phase voltage of three-phase alternating current by the inverter 24 and phase current Ipc of each of the three phases is supplied to the coil of each phase of the electric motor 12 by so-called 120-degree energization in the present embodiment. An expensive transformer current sensor that directly detects the phase current Ipc is not used.

A magnetic pole position Mp of a rotor of the electric motor 12 is output from the output side of a magnetic-pole position detection circuit 34 the input side of which is connected to a resolver (not illustrated) of the electric motor 12.

The ECU 50 is composed of a computer. The ECU 50 also operates as a functional unit realizing various functions with a central processing unit (CPU) that executes programs stored in a memory, such as a read only memory (ROM), on the basis of various inputs. The functions may be realized by hardware.

In the present embodiment, the ECU 50 functions as, for example, a phase-current instruction-value setter 52, a phase-current instruction-value limiter 54, a low pass filter (LPF) 56, a current-voltage converter (I/V converter, an instruction current value-instruction voltage value converter) 58, an instruction voltage-duty converter 60, a phase current estimator 62, a PWM signal generator 64, a magnetic pole position-speed converter 66, and a phase-current allowable-value setter (Ipcp setter) 70, which function as a speed controller.

The ECU 50 further includes a draw-current allowable-value storage device (Ibatth storage device) 71.

A draw current allowable value Ibatth of the electric storage device 14 is stored in the draw-current allowable-value storage device 71. The draw current allowable value Ibatth is set in accordance with a rated current value Iry of an electrical component having the smallest rated current value Irv, among the fuse 16, the relays 18, and the harnesses 22, which are the system disconnecting-connecting units in a power system from the electric storage device 14 to the electric motor 12, and the transistors Q1 to Q6 (Ibatth Irv).

The electrical component having the smallest rated current value Iry is the fuse 16 in the present embodiment. The draw current allowable value Ibatth is set to a value that is equal to a certain percentage (lower than 100%) of the rated current value Iry of the fuse 16 and the draw current allowable value Ibatth that is set is stored in advance in the draw-current allowable-value storage device 71.

The characteristic (relationship) between the values (0[%] to 1[100%]) of a duty Duty of a PWM signal supplied from the PWM signal generator 64 and a phase current allowable value Ipcp and the characteristic (relationship) between the values 0 to 1 of the duty Duty of the PWM signal and the draw current Ibat are stored in the phase-current allowable-value setter 70.

Figure 2:
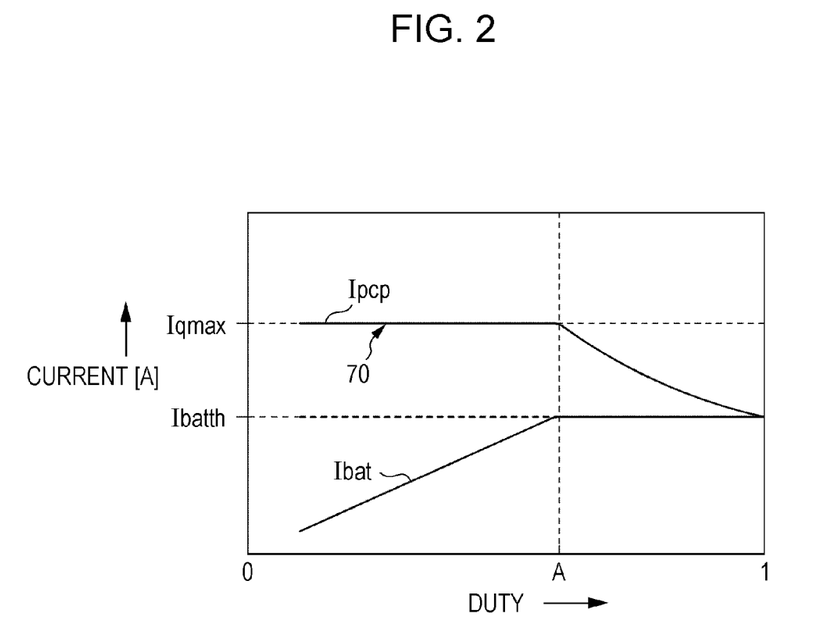

FIG. 2 is a graph illustrating the relationship of the phase current allowable value Ipcp, the draw current allowable value Ibatth, and the draw current Ibat with respect to the values 0 to 1 of the duty Duty of the PWM signal.

As widely known, the draw current Ibat from the electric storage device 14 is calculated by multiplying the phase current Ipc of the electric motor 12 by the duty Duty of the PWM signal, which determines the ON time of the transistors Q1 to Q6, according to Equation (1). It is noted that the draw current Ibat is equal to the phase current Ipc (Ibat=Ipc) when the duty Duty=1.

$$Ibat=Ipc \times Duty \qquad (1)$$

The phase current Ipc is calculated according to Equation (2) resulting from modification of Equation (1):

$$Ipc=Ibat/Duty \qquad (2)$$

As illustrated in the characteristic diagram in FIG. 2, when the duty Duty of the PWM signal is equal to a value between 0 to A (the duty Duty of the PWM signal=0 to A), since the phase current Ipc may have a value up to a maximum rated current value Iqmax of the transistors Q1 to Q6, which are the switching elements, the phase current allowable value Ipcp is allowed to have a value up to the maximum rated current value Iqmax (Ipcp=Iqmax: Duty=0 to A). When the duty Duty=0 to A, the draw current Ibat may be gradually increased to the draw current allowable value Ibatth according to Equation (2) provided that Ipc=Ipcp.

Since the draw current Ibat is limited to the draw current allowable value Ibatth when the duty Duty exceeds the value A, the phase current allowable value Ipcp gradually decreases when the duty Duty=A to 1 according to Equation (2) provided that Ipc=Ipcp and Ibat=Ibatth and the phase current allowable value Ipcp is limited to the draw current allowable value Ibatth when the duty Duty=1.

In other words, Ipcp=Ibatth=Ibat when Duty=1.

The phase current allowable value Ipcp considering the draw current allowable value Ibatth, the duty Duty, and the maximum rated current value Iqmax is set for the phase-current instruction-value limiter 54 from the phase-current allowable-value setter 70 in the above manner.

The magnetic pole position-speed converter 66 receiving the magnetic pole position Mp, which is the output from the magnetic-pole position detection circuit 34, at its input side calculates an estimated rotation speed Nm [rpm] of the electric motor 12 and supplies the calculated estimated rotation speed Nm [rpm] to one input terminal of the phase-current instruction-value setter 52.

A rotation speed instruction value Nmcom [rpm] of the electric motor 12 is supplied from an upper-level control apparatus to the other input terminal of the phase-current instruction-value setter 52 in response to, for example, an operation with an acceleration pedal (not illustrated).

The phase-current instruction-value setter 52 calculates a phase current instruction value Ipccom causing the estimated rotation speed Nm to be equal to the rotation speed instruction value Nmcom and supplies the calculated phase current instruction value Ipccom to the input terminal of the phase-current instruction-value limiter 54.

The phase-current instruction-value limiter 54 compares the phase current instruction value Ipccom with the phase current allowable value Ipcp to output a phase current instruction value Ipccom' so that the phase current instruction value Ipccom does not exceed the phase current allowable value Ipcp.

Specifically, the phase-current instruction-value limiter 54 makes the phase current instruction value Ipccom' to be output equal to the phase current instruction value Ipccom that is input when Ipccom Ipcp and sets the phase current instruction value Ipccom' to be output to the phase current allowable value Ipcp illustrated in FIG. 2 when Ipccom>Ipcp.

The low pass filter 56 performs a buffering process of an input signal. The low pass filter 56 has a function to attenuate higher frequency signal components and transmit lower frequency signal components. In the present embodiment, a primary delay filter indicated by representation (3) is set for the low pass filter 56.

$$Ipccom' \leftarrow Ipccom'\{1/(1+sT)\} \quad (3)$$

In the representation (3), s denotes a Laplace operator, T denotes a time constant represented by T=½ π·fc, and fc denotes a cutoff frequency. The low pass filter 56 is not limited to the primary delay filter and may be any filter having the function to attenuate higher frequency signal components and transmit lower frequency signal components.

In the present embodiment, when the phase current instruction value Ipccom higher than the phase current allowable value Ipcp is supplied to the phase-current instruction-value limiter 54, the low pass filter 56 performs the buffering process (filtering process) of the limited phase current allowable value Ipcp. In contrast, when the phase current instruction value Ipccom lower than the phase current allowable value Ipcp is supplied to the phase-current instruction-value limiter 54, the low pass filter 56 performs the buffering process using the phase current instruction value Ipccom and supplies the phase current instruction value Ipccom' subjected to the buffering process, that is, the phase current instruction value Ipccom' that does not rapidly vary to the current-voltage converter 58.

The phase current estimator 62 estimates the phase current Ipc from the output from the current detection circuit 28 detecting a decrease in voltage of the resistor R3 to detect the draw current Ibat, that is, the draw current value Ibat and the duty Duty of the PWM signal (the ON time of the switching elements) according to Equation (2) and supplies a phase current estimated value Ipce to the phase-current instruction-value limiter 54.

In this case, since the phase-current instruction-value limiter 54 controls (adjusts) the phase current instruction value Ipccom' so that the phase current estimated value Ipce estimated by the phase current estimator 62 does not exceed the phase current allowable value Ipcp, it is not necessary to use a current sensor that directly detects the phase current Ipc of the electric motor 12 to decrease the cost of the output control apparatus 10 for the electric motor 12.

The current-voltage converter 58 converts the phase current instruction value Ipccom' into an instruction voltage Vcom.

The instruction voltage-duty converter 60 calculates the duty Duty on the basis of the instruction voltage Vcom and the power supply voltage value Vbat of the electric storage device 14 to supply the calculated duty Duty to the PWM signal generator 64, the phase current estimator 62, and the phase-current allowable-value setter 70.

The PWM signal generator 64 generates the PWM signal on the basis of the duty Duty to supply the generated PWM signal to the gate drive circuit 32.

Figure 3:
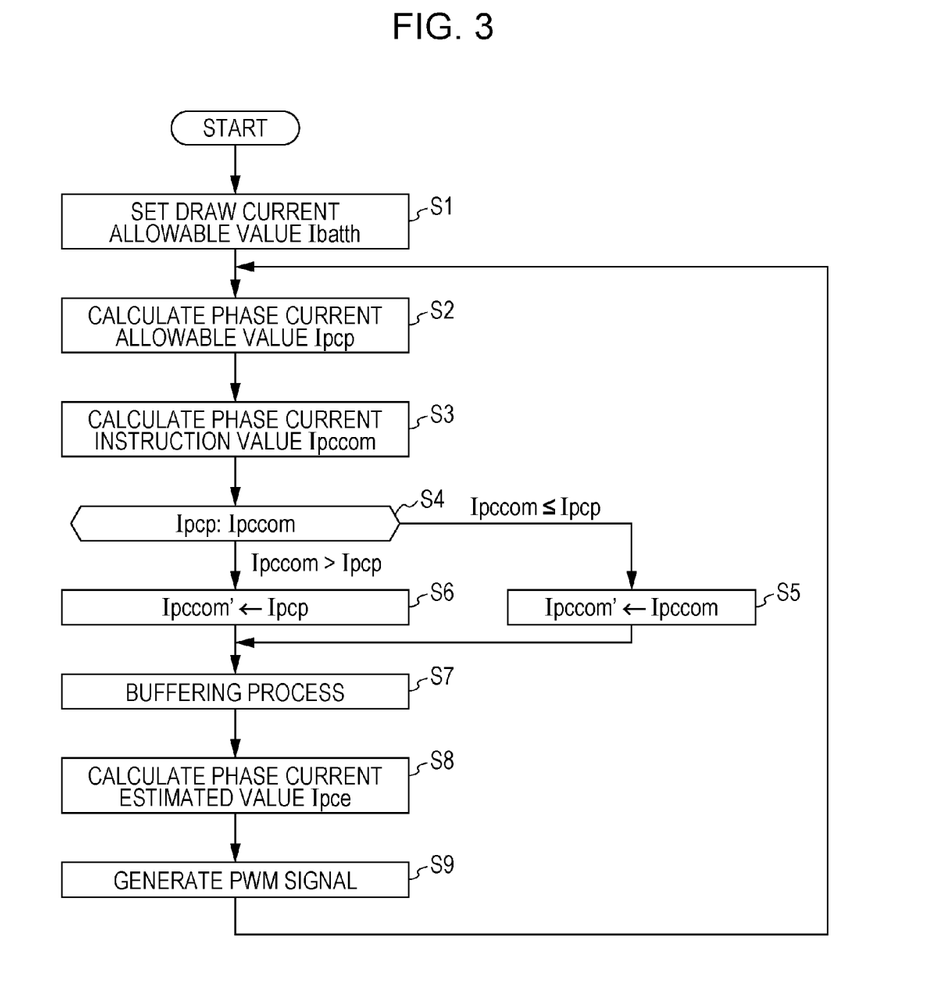
FIG. 3 is a flowchart illustrating an example of a process of limiting and controlling a phase current.

FIG. 3 is a flowchart illustrating an example of an operational process performed by the output control apparatus 10 for the electric motor 12, which basically is configured and operates in the above manner. The programs concerning the flowchart in FIG. 3 are executed by the CPU (not illustrated) in the ECU 50.

Referring to FIG. 3, in Step S1, the ECU 50 sets the draw current allowable value Ibatth for preventing abnormal melting of the fuse 16 and stores the draw current allowable value Ibatth in the draw-current allowable-value storage device 71, as described above. Practically, the draw current allowable value Ibatth is calculated by an external control apparatus and is stored in the draw-current allowable-value storage device 71 via the ECU 50.

If the draw current Ibat of the electric storage device 14 does not exceed the draw current allowable value Ibatth, the fuse 16 is prevented from being subjected to the abnormal melting. The abnormal melting of the fuse 16 means that the fuse 16 melts, for example, despite the fact that the draw current Ibat from the electric storage device 14 does not exceed the rated current value of the electric storage device 14 to block the supply of the draw current Ibat output from the electric storage device 14, that is, the discharge current to the electric motor 12.

In Step S2, the phase-current instruction-value limiter 54 refers to the draw current allowable value Ibatth, the duty Duty of the current PWM signal, and the maximum rated current value Iqmax of the transistors Q1 to Q6 to calculate the current phase current allowable value Ipcp.

As illustrated in FIG. 2, the phase current allowable value Ipcp is equal to the maximum rated current value Iqmax (Ipcp=Iqmax) when the duty Duty has a value between zero to A and is calculated by dividing the draw current allowable value Ibatth by the duty Duty (Ipcp=Ibatth/Duty) with reference to Equation (2) when the duty Duty has a value from A to one.

In Step S3, the phase-current instruction-value setter 52 calculates the phase current instruction value Ipccom causing the estimated rotation speed Nm detected via the magnetic-pole position detection circuit 34 for the electric motor 12 and the magnetic pole position-speed converter 66 to be equal to the rotation speed instruction value Nmcom.

In Step S4, the phase-current instruction-value limiter 54 compares the phase current instruction value Ipccom with the phase current allowable value Ipcp. If the phase current instruction value Ipccom is lower than or equal to the phase current allowable value Ipcp (Ipccom≤Ipcp), in Step S5, the phase-current instruction-value limiter 54 sets the phase current instruction value Ipccom as the phase current instruction value Ipccom' (Ipccom'←Ipccom).

If the phase current instruction value Ipccom is higher than the phase current allowable value Ipcp (Ipccom>Ipcp) in Step S4, in Step S6, the phase-current instruction-value limiter 54 replaces the phase current instruction value Ipccom with the phase current allowable value Ipcp and sets the phase current allowable value Ipcp as the phase current instruction value Ipccom' (Ipccom'←Ipcp).

In the buffering process in Step S7, the low pass filter 56 performs smoothing on the basis of the representation (3) to suppress a rapid variation of the phase current instruction value Ipccom'.

In Step S8, the phase current estimator 62 calculates the phase current estimated value Ipce on the basis of the current duty Duty and the draw current value Ibat.

Practically, in Step S8, the phase-current instruction-value limiter 54 sets the phase current instruction value Ipccom' so that the phase current estimated value Ipce does not exceed the phase current allowable value Ipcp and so that the phase current instruction value Ipccom' set in Step S5 or S6 does not exceed the phase current allowable value Ipcp and supplies the phase current instruction value Ipccom' that is set to the low pass filter 56.

In Step S9, the current-voltage converter 58 converts the phase current instruction value Ipccom' that is subjected to the smoothing into the instruction voltage value Vcom, and the instruction voltage-duty converter 60 generates the PWM signal having a duty Duty calculated on the basis of the relationship between the instruction voltage value Vcom the actual power supply voltage value Vbat and supplies the generated PWM signal to the gate drive circuit 32.

As a result, the draw current value Ibat composed of the phase current Ipc corresponding to the three phases, which flows depending on the power supply voltage value Vbat, the on duty of the transistors Q1 to Q6, and the characteristics of the electric motor 12, is controlled so as not to exceed the draw current allowable value Ibatth.

In other words, the driving of the gate drive circuit 32 via the PWM signal generator 64 controls the draw current Ibat flowing through the resistor R3, that is, the draw current Ibat flowing from the electric storage device 14 so as to have a value lower than or equal to the draw current allowable value Ibatth of the electric storage device 14 in accordance with the characteristic of the draw current Ibat illustrated in FIG. 2.

Then, the steps subsequent to Step S2 are repeated by using the duty Duty newly calculated in Step S9.

As described above, the electric power (Vbat×Ibat) supplied from at least the electric storage device 14 is supplied to the output control apparatus 10 for the electric motor 12 via the inverter 24 functioning as the power converter including the transistors Q1 to Q6, which are the switching elements, in the above embodiments.

The output control apparatus 10 for the electric motor 12 includes the phase-current instruction-value setter 52 that sets the phase current instruction value Ipccom of the electric motor 12 corresponding to the rotation speed instruction value Nmcom, which is set on the basis of a request to the electric motor 12, and the current estimated rotation speed Nm; the draw-current allowable-value storage device 71 that stores the draw current allowable value Ibatth of the electric storage device 14 corresponding to the allowable current value of the fuse 16 functioning as the system disconnecting-connecting unit in the power system from the electric storage device 14 to the electric motor 12; the phase-current allowable-value setter 70 that sets the phase current allowable value Ipcp on the basis of the draw current allowable value Ibatth and the duty Duty, which indicates the ON time of the switching elements in the inverter 24; and the phase-current instruction-value limiter 54 that compares the phase current instruction value Ipccom with the phase current allowable value Ipcp to limit the phase current instruction value Ipccom' to be output so as not to exceed the phase current allowable value Ipcp.

According to the above embodiments, since the phase current instruction value Ipccom, which is set on the basis of a request for the rotation speed instruction value Nmcom, etc. to the electric motor 12, is limited so as not to exceed the phase current allowable value Ipcp, which is set on the basis of the draw current allowable value Ibatth of the electric storage device 14 and the duty Duty of the inverter 24, the output from the electric motor 12 is rapidly controlled in a feed-forward manner. Accordingly, it is possible to control the inverter 24 so that the draw current Ibat from at least the electric storage device 14 does not exceed the draw current allowable value Ibatth.

Since the phase current instruction value Ipccom is compared with the phase current allowable value Ipcp as described above, it is possible to estimate the behavior of the electric motor 12 before the electric motor 12 is actually controlled to limit the draw current Ibat from the electric storage device 14. Accordingly, it is possible to suppress the variation in output from the electric motor 12 to protect the system disconnecting-connecting unit, such as the fuse 16, in the power system from the electric storage device 14 to the electric motor 12 against the over-current.

The electric power supplied from at least the electric storage device 14 is defined in the above description because the present disclosure is applicable not only to the electric storage device 14 but also to a power system of a fuel cell vehicle or a hybrid vehicle in which a fuel cell or a power generator is connected in parallel to the electric storage device 14. Specifically, the draw current resulting from combination of the draw current Ibat of the electric storage device 14 with the draw current of the fuel cell or the power generator may be controlled as the draw current Ibat detected by the resistor R3.

The phase-current instruction-value limiter 54 replaces the phase current instruction value Ipccom' to be output with the phase current allowable value Ipcp if the current setting value of at least the phase current instruction value Ipccom reaches the phase current allowable value Ipcp and the low pass filter 56 smoothes the phase current instruction value Ipccom' in the above embodiments. Accordingly, it is possible to prevent the phase current instruction value Ipccom' from being rapidly varied to stably control the output from the electric motor 12.

In other words, since the phase current instruction value Ipccom' is gradually varied, it is possible to prevent a state in which the phase current Ipc is rapidly increased to exceed the draw current allowable value Ibatth from occurring, thereby stably controlling the output from the electric motor 12.

Since the phase current estimator 62 estimates the phase current Ipc of the electric motor 12 on the basis of the draw current Ibat detected by the current detection circuit 28 and the duty Duty of the PWM signal and the phase-current instruction-value limiter 54 controls the estimated phase current estimated value Ipce so as not to exceed the phase current allowable value Ipcp in the above embodiments, it is not necessary to use an expensive current sensor that directly measures the phase current Ipc of the electric motor 12.

While the present disclosure is described in terms of some specific examples and embodiments, it will be clear that this disclosure is not limited to these specific examples and embodiments and that many changes and modified embodiments will be obvious to those skilled in the art without departing from the true spirit and scope of the disclosure.

According to the embodiment, an output control apparatus for an electric motor to which electric power that is supplied from at least an electric storage device is supplied via a power converter including a switching element includes a phase-current instruction-value setting unit that sets a phase current instruction value of the electric motor on the basis of a request to the electric motor; a draw-current allowable-value storage unit that stores a draw current allowable value of the electric storage device corresponding to an allowable current value of a system disconnecting-connecting unit in a power system from the electric storage device to the electric motor; a phase-current allowable-value setting unit that sets a phase current allowable value on the basis of the draw current allowable value and an ON time of the switching element in the power converter; and a phase-current instruction-value limiting unit that compares the phase current instruction value with the phase current allowable value to limit the phase current instruction value so as not to exceed the phase current allowable value.

With the above configuration of the embodiment, since the phase current instruction value that is set on the basis of a request to the electric motor is limited so as not to exceed the phase current allowable value that is set on the basis of the draw current allowable value of the electric storage device and the ON time of the switching element, the output from the electric motor is rapidly controlled. Accordingly, it is possible to control the power converter including the switching element so that the draw current from at least the electric storage device does not exceed the draw current allowable value.

The electric power supplied from at least the electric storage device is defined because the present disclosure is applicable to a case in which a fuel cell or a power generator is connected in parallel to the electric storage device.

The phase-current instruction-value limiting unit may replace the phase current instruction value with the phase current allowable value when the current setting value of at least the phase current instruction value reaches the phase current allowable value. In this case, it is possible to prevent the phase current instruction value from exceeding the phase current allowable value.

The output control apparatus for an electric motor may further include a low pass filter that smoothes the phase current instruction value. In this case, it is possible to prevent the phase current instruction value from rapidly varying to stably control the output from the electric motor.

The output control apparatus for an electric motor may further include a phase current estimating unit that estimates a phase current estimated value of the electric motor on the basis of a draw current value of the electric storage device and an ON time of the switching element. The phase-current instruction-value limiting unit may control (adjust) the phase current instruction value so that the phase current estimated value estimated by the phase current estimating unit does not exceed the phase current allowable value. In this case, it is not necessary to use a current sensor that directly measures the phase current of the electric motor.

According to the embodiment, since the phase current instruction value that is set on the basis of a request to the electric motor is limited so as not to exceed the phase current allowable value that is set on the basis of the draw current allowable value of the electric storage device and the ON time of the switching element in the power converter, the output from the electric motor is rapidly controlled in a feed-forward manner. Accordingly, it is possible to control the power converter including the switching element so that the draw current from at least the electric storage device does not exceed the draw current allowable value.

In other words, since the phase current instruction value is compared with the phase current allowable value, it is possible to estimate the behavior of the electric motor before the electric motor is actually controlled to control the electric motor. Accordingly, the variation in output from the electric motor is suppressed and an occurrence of the over-current in the draw current from the electric storage device to the power system is limited to prevent an abnormal operation of the system disconnecting-connecting unit in the power system.

Obviously, numerous modifications and variations of the present invention are possible in light of the above teachings. It is therefore to be understood that within the scope of the appended claims, the invention may be practiced otherwise than as specifically described herein.

What is claimed is:

1. An output control apparatus for an electric motor, the output control apparatus comprising:
    a phase-current instruction-value setting device configured to set a phase current instruction value of the electric motor based on a request to the electric motor to which electric power is supplied from at least an electric storage device via a power converter including a switching element;
    a draw-current allowable-value storage device configured to store previously a draw current allowable value of the electric storage device corresponding to an allowable current value of a system disconnecting-connecting device provided in a power system from the electric storage device to the electric motor;
    a phase-current allowable-value setting device configured to set a phase current allowable value based on the draw current allowable value and an ON time of the switching element in the power converter; and
    a phase-current instruction-value limiting device configured to compare the phase current instruction value with the phase current allowable value to limit the phase current instruction value so as not to exceed the phase current allowable value.

2. The output control apparatus for an electric motor according to claim 1,
    wherein the phase-current instruction-value limiting device replaces the phase current instruction value with the phase current allowable value if a current setting value of at least the phase current instruction value reaches the phase current allowable value.

3. The output control apparatus for an electric motor according to claim 1, further comprising:
    a low pass filter configured to smooth the phase current instruction value.

4. The output control apparatus for an electric motor according to claim 2, further comprising:
    a phase current estimating device configured to estimate a phase current estimated value of the electric motor based on a draw current value of the electric storage device and an ON time of the switching element,
    wherein the phase-current instruction-value limiting device is configured to control the phase current instruction value so that the phase current estimated value estimated by the phase current estimating device does not exceed the phase current allowable value.

5. The output control apparatus for an electric motor according to claim 1, wherein the system disconnecting-connecting device is a fuse, a relay, or a harness.

6. The output control apparatus for an electric motor according to claim 1, wherein the draw current allowable value is set in accordance with a rated current value of the system disconnecting-connecting device.

7. The output control apparatus for an electric motor according to claim 1, wherein the draw current allowable value is set to a value that is equal to a predetermined percentage of a rated current value of the system disconnecting-connecting device.

8. The output control apparatus for an electric motor according to claim 1,
wherein the power system includes a plurality of system disconnecting-connecting devices, and
wherein the draw current allowable value is set in accordance with a rated current value of the system disconnecting-connecting device of the plurality of system disconnecting-connecting devices component having a smallest rated current value.

9. The output control apparatus for an electric motor according to claim 8, wherein the plurality of system disconnecting-connecting devices includes a fuse, a relay, and a harness.

10. An output control apparatus for an electric motor, the output control apparatus comprising:
phase-current instruction-value setting means for setting a phase current instruction value of the electric motor based on a request to the electric motor to which electric power is supplied from at least an electric storage device via a power converter including a switching element;
draw-current allowable-value storage means for storing previously a draw current allowable value of the electric storage device corresponding to an allowable current value of a system disconnecting-connecting device provided in a power system from the electric storage device to the electric motor;
phase-current allowable-value setting means for setting a phase current allowable value based on the draw current allowable value and an ON time of the switching element in the power converter; and
phase-current instruction-value limiting means for comparing the phase current instruction value with the phase current allowable value to limit the phase current instruction value so as not to exceed the phase current allowable value.

11. The output control apparatus for an electric motor according to claim 10, wherein one or more of the phase-current instruction-value setting means, the draw-current allowable-value storage means, the phase-current allowable-value setting means, and the phase-current instruction-value limiting means are provided as a processor programmed to perform functions associated therewith.

12. A method for controlling an output of an electric motor, the method comprising:
setting a phase current instruction value of the electric motor based on a request to the electric motor to which electric power is supplied from at least an electric storage device via a power converter including a switching element;
storing previously a draw current allowable value of the electric storage device corresponding to an allowable current value of a system disconnecting-connecting device provided in a power system from the electric storage device to the electric motor;
setting a phase current allowable value based on the draw current allowable value and an ON time of the switching element in the power converter; and
comparing the phase current instruction value with the phase current allowable value to limit the phase current instruction value so as not to exceed the phase current allowable value.

13. The method according to claim 12, wherein the system disconnecting-connecting device is a fuse, a relay, or a harness.

14. The method according to claim 12, wherein the draw current allowable value is set in accordance with a rated current value of the system disconnecting-connecting device.

15. The method according to claim 12, wherein the draw current allowable value is set to a value that is equal to a predetermined percentage of a rated current value of the system disconnecting-connecting device.

16. The method according to claim 12,
wherein the power system includes a plurality of system disconnecting-connecting devices, and
wherein the draw current allowable value is set in accordance with a rated current value of the system disconnecting-connecting device of the plurality of system disconnecting-connecting devices component having a smallest rated current value.

17. The method according to claim 16, wherein the plurality of system disconnecting-connecting devices includes a fuse, a relay, and a harness.

* * * * *